Patented Aug. 11, 1931

1,817,933

UNITED STATES PATENT OFFICE

EDGAR S. ROSS, OF PITTSBURGH, PENNSYLVANIA, ASSIGNOR TO THE PHILIP CAREY MANUFACTURING COMPANY, A CORPORATION OF OHIO

BITUMINOUS PRODUCT

No Drawing.  Application filed June 26, 1924.  Serial No. 722,596.

My invention relates to a bituminous product for any use where it is desirable to have an elastic like product that will withstand the effect of exposure to the elements and that may be subjected to irregular or constant pressure without permanent displacement or permanent deformation. It is especially adapted for use as an expansion joint filler, as a pad for rails on concrete or other rigid ties in railway construction, as a pad on shim for automobiles between any portions where it is desirable to absorb vibration and stresses or strains, may also be used as a floor covering or mat, road surfacing, roofing and for other weather resisting purposes. It is also adapted for use in any locations where it is desirable to provide means for absorbing strains or stresses due to vibration or like causes, or to absorb the force of impact resulting from shocks, etc., for the purpose of preventing damage or destruction to adjacent structures. My invention may be used for any purpose where a mat is required that has considerable resiliency and will for a reasonable time withstand wear due to shock, stresses, vibrations, friction or abrasion. The product also has a high resistance to flow under pressure and will have considerable tensile strength.

My improved bituminous product is preferably composed of asphalt, either natural or blown, combined with, rubber, or a rubber compound, or a scrap material containing rubber, to which I add, if the use requires, a suitable fibrous binder and in some cases a filler which is preferably a mineral. These materials when combined and mixed are then formed to the desired shape, depending on the use to which the material is to be put. After or during the formation of the product to the desired form I may apply to the surface a suitable non-adhesive material, such as talc, soapstone, mica or other suitable pulverized or granulated materials, or a suitable sheet material, such as paper, to facilitate the handling and shipping of same without sticking of adjacent pieces of the product.

In the manufacture of my bituminous product I prepare the rubber material upon which depends the degree of resiliency of my product, and consequently regulates the quantity of rubber used, by grinding the rubber material to the desired size of particles and incorporate it, by mixing, with the bituminous material, preferably asphalt, which has been heated to a suitable consistency to permit thorough mixing of the rubber and asphalt. I then add the fibrous binder and the mineral filler and thoroughly mix those with the asphalt rubber mix, while it is still heated to a proper consistency. The mix is then while in a heated condition formed to the desired shape by passing between rolls, extruded under pressure through an orifice, poured on molds or on other surfaces, etc. Where it is to have a surface coating of non-adhesive material it is applied either while the material is being formed to shape or to the finished product. The use to which the product is to be put determines to a great degree the relative proportion of the ingredients also which if any of the ingredients can be dispensed with. If for instance a product of relatively high degree of elasticity and resiliency is required I use a major proportion of rubber material bonded with asphalt. If I desire to increase the tensile strength of such a product as last mentioned I add fibers of any suitable material and of a suitable length. The addition of the fibers I find adds considerable tensile strength to the composition of rubber and asphalt although a product made of rubber and asphalt only would have sufficient tensile strength for many uses. The fiber is also used to afford resistance to flow of material under pressure, and abrasion or other surface wearing action. Any fibers such as vegetable, animal, mineral or metallic fibers may be used. Where a product having a very high degree of resistance to abrasion and wear from material or other causes such as traffic as in the case of road surfacing material, floorings, etc., is desired, I prefer to use the filler of mineral such as clay, magnesia, sand, cement or other similar filler materials which give greater body, weight and hardness to the product all of which increase its wearing qualities. The length of time during which it is desirable to have the product serve its purpose is regulated by the bituminous material content, as while that material acts as a binder, it also is the life giving and weather resisting ingredient.

As will be seen from the above the greater the amount of asphalt used the longer the life of the product but the less elasticity. From this it is evident that the elasticity may be regulated and the life of the product regulated by the relative quantities of these two materials used. It is also evident that the resistance of the product to wear and its resistance to flow under pressure may be regulated by the quantity of either the fibrous binder or the filler or both.

From the above it is evident that the essential ingredients are the rubber and bituminous material and that the use of either or both of the other ingredients depends upon the use to which the product is to be put.

For many purposes, the following general formula may be found useful in carrying out my invention:

|  | Per cent by weight |
|---|---|
| Asphalt | 55 to 70 |
| Rubber | 15 to 30 |
| Fibre | 15 to 30 |
| Filler | .0 to 15 |

A very satisfactory product has been obtained by me from the following formula:

|  | Per cent by weight |
|---|---|
| Asphalt | 55 |
| Rubber | 20 |
| Fibre | 20 |
| Filler | 5 |

The following formulas have also been found satisfactory:

|  | Per cent |
|---|---|
| Asphalt | 60 |
| Rubber | 20 |
| Fibre | 15 |
| Filler | 5 |

|  | Per cent |
|---|---|
| Asphalt | 65 |
| Rubber | 20 |
| Fibre | 15 |
| Filler | .0 |

Of course, in giving these formulas, I do not wish to be understood as restricting myself to them, as they may be varied to suit the requirements of the finished product without departing from my invention.

Where a hard product is desired in addition to the use of the filler I also form the product under high pressure so as to compact the mass.

It is likewise evident that a product can be made, embodying my invention, using different combinations as for instance a, asphalt and rubber, or b, asphalt, rubber and fiber, or c, asphalt, rubber and a filler, or d, asphalt, rubber, fibres and a filler.

While the rubber used may be either vulcanized, devulcanized, or unvulcanized rubber or may be gutta percha, wild rubber, plantation rubber, reclaimed rubber or any waste products containing rubber such as tires, inner tubes, hose, etc., I have found that it is not essential and I prefer not to vulcanize my improved product nor is it necessary that the rubber used be vulcanized. Where I use scrap materials, such as tires, hose, etc. the fibrous or fabric materials in such scrap would serve the purpose of the fibrous material which I have referred to, and in the grinding of the scrap those fibers would be sufficiently separated to be mixed with the material so as to serve as a binder.

Claims—

1. An article of manufacture adapted to absorb vibrations and stresses or strains, comprising a body having considerable resiliency and a relatively high resistance to flow under pressure, composed of a mechanical mixture of asphaltic bitumen, rubber and fibrous material having the characteristics produced by preforming such mixture under pressure, the bitumen and rubber forming the major portion of the mixture.

2. An article of manufacture comprising a body having considerable resiliency and composed of a mechanical mixture of asphalt, rubber material and fibrous matter, having the characteristics produced by preforming such mixture under pressure.

3. An article of manufacture adapted to absorb vibrations and stresses or strains comprising a body having considerable resiliency and a relatively high resistance to flow under pressure, composed of a mechanical mixture of asphaltic bitumen and rubber having the characteristics produced by preforming such mixture under pressure, one or more of the surfaces of said body being provided with a sheet of non-adhesive material.

4. An article of manufacture adapted to absorb vibrations and stresses or strains comprising a body having considerable resiliency and a relatively high resistance to flow under pressure, composed of a mechanical mixture of asphalt, and scrap rubber material containing fibrous matter, having the characteristics produced by preforming each mixture under pressure, the asphalt and rubber forming the major portion of the mixture.

5. An expansion joint filler comprising a body having considerable resiliency and a relatively high resistance to flow under pressure, composed of a mechanical mixture consisting chiefly of asphaltic bitumen, rubber and fibrous material having the plastic constituents of the mass in intimate contact with the fibrous material.

6. An expansion joint filler as in claim 5 having attached to one face thereof a ply of sheet material to give such face a non-adhesive surface.

7. An expansion joint filler comprising a body having considerable resiliency and elasticity and containing rubber, and a ply of sheet material attached to one face thereof to give such face a non-adhesive surface.

8. An expansion joint filler, comprising a body having considerable resiliency and a relatively high resistance to flow under pressure, composed chiefly of asphaltic bitumen and rubber and having attached to one face thereof a ply of sheet material to give such face a non-adhesive surface.

9. A construction material composed of a body containing a major proportion of rubber and provided with suitable non-adhesive sheet material on the sides.

10. An expansion joint composed of a body containing a major proportion of rubber and provided with suitable non-adhesive sheet material on the side.

11. An expansion joint composed of a body of elastic material containing rubber and fibrous materials and suitable sheet material on the sides of said body.

12. An expansion joint composed of a body of elastic material containing rubber, fibrous and bituminous materials and suitable sheet material on the sides of said body.

13. An expansion joint material composed of a resilient body including a rubber-like material and having on its surface layers of non-adhesive sheet material sealing the surfaces.

In testimony whereof, I have signed my name to this specification.

EDGAR S. ROSS.